United States Patent [19]
Kobayashi

[11] Patent Number: 6,049,157
[45] Date of Patent: *Apr. 11, 2000

[54] ANGULAR VELOCITY SENSOR

[75] Inventor: Hiroaki Kobayashi, Miyagi, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/004,736

[22] Filed: Jan. 9, 1998

[30] Foreign Application Priority Data

Jan. 10, 1997 [JP] Japan ................................. 9-003374

[51] Int. Cl.[7] ...................................................... G01P 15/09
[52] U.S. Cl. ........................................................ 310/316.01
[58] Field of Search .................................... 310/316, 367, 310/370, 316.01

[56] References Cited

U.S. PATENT DOCUMENTS

| | | | |
|---|---|---|---|
| 4,960,000 | 10/1990 | Wiget | 73/778 |
| 5,345,822 | 9/1994 | Nakamura et al. | 310/316 |
| 5,375,336 | 12/1994 | Nakamura | 33/324 |
| 5,420,548 | 5/1995 | Nakajima | 310/370 |
| 5,520,050 | 5/1996 | Nakamura | 310/316 |
| 5,783,897 | 7/1998 | Okaguchi | 310/316 |

*Primary Examiner*—Thomas M. Dougherty
*Attorney, Agent, or Firm*—Hill & Simpson

[57] ABSTRACT

The present invention provides an angular velocity sensor having a simplified configuration and a superior detection sensitivity by sufficiently utilizing the capability of the piezoelectric elements.

A plurality of piezoelectric elements 3, 4, and 5 are attached to a constant-elastic metal oscillator 2. One of the piezoelectric elements 3, 4, and 5 is made to function as an impedance element of the Colpitts oscillation circuit, constituting a self-oscillation type drive circuit 6. While this self-oscillation type drive circuit 6 is driven so as to oscillate the constant-elastic metal oscillator 2, the Coriolis force generated in the constant-elastic metal oscillator 2 is detected by the other piezoelectric elements 4 and 5.

3 Claims, 11 Drawing Sheets

ANGULAR VELOCITY SENSOR

BACKGROUND OF THE INVENTION

1. Field of the Invention

The present invention relates to an angular velocity sensor used, for example, in detecting an unintentional movement of a video camera, in operation detection in a virtual reality apparatus, in direction detection in a car navigation system, and the like.

2. Description of the Prior Art

An angular rate sensor oscillates an oscillator at a predetermined resonance frequency so as to detect with a piezoelectric element or the like a Coriolis force generated by affects of an angular velocity.

Conventionally, there are two methods for driving an oscillation gyro with a single piezoelectric element: a method using an externally-oscillated type drive circuit and a method using a self-oscillation type drive circuit. However, the method using the externally-oscillated type drive circuit has a problem that a difference is generated in the resonance frequency between oscillation frequency and the oscillator due to temperature characteristics of the oscillator, the piezoelectric element, the circuit or the like, which significantly lowers a Coriolis force detection sensitivity, and this type of sensor is not yet implemented in practice.

Currently, as shown in FIG. 1 and FIG. 2, an angular velocity sensor using a self-oscillation type drive circuit is used, employing a built-in oscillator in a phase oscillation circuit loop. In such an angular velocity sensor, as self-oscillation is obtained by the resonance frequency of the oscillator, the detection sensitivity is not much affected by the temperature characteristics, enabling to obtain a stable detection sensitivity in a wide range of temperature.

FIG. 1 shows an angular velocity sensor includes an oscillator 104 made from a constant-elastic metal oscillator 100 having a shape of a triangle pole whose faces has a first piezoelectric element 101 consisting of an electrode 101a and a piezoelectric body 101b, a second piezoelectric element 102 consisting of an electrode 102a and a piezoelectric body 102b, and a third piezoelectric element 103 consisting of an electrode 103a and a piezoelectric body 103b. Moreover, this angular velocity sensor includes: an amplifier 105 connected to the first piezoelectric element 101; a phase converter 106 connected to the amplifier 105; a differential amplifier 107 connected to the second piezoelectric element 102 and to the third piezoelectric element 103; a synchronization detector 108 connected to the differential amplifier 107; and a low pass filter 109 connected to the synchronization detector 108.

Such an angular velocity sensor using the oscillator of a triangle pole shape has currently the highest sensitivity and is widely used. In this angular velocity sensor, in order to cause self-oscillation, the second piezoelectric element 102 and the third piezoelectric element 103 detect an oscillation of the oscillator 104 as well as a Coriolis force generated in the oscillator 104. That is, in this angular velocity sensor, the same piezoelectric element serves for two functions: detecting an oscillation of the oscillator 104 for generating self-oscillation and detecting a Coriolis force. For this, in this angular velocity sensor, the voltage used for detecting a Coriolis force is limited by the drive voltage of the oscillator 104 and the power voltage, and it is impossible to sufficiently utilize the detection capability of the piezoelectric elements.

On the other hand, FIG. 2 shows an angular velocity sensor including an oscillator 115 made from a constant-elastic metal oscillator 110 having a shape of a square pole whose faces has a first piezoelectric element 111 consisting of an electrode 111a and a piezoelectric body 111b, a second piezoelectric element 112 consisting of an electrode 112a and a piezoelectric body 112b, a third piezoelectric element 113 consisting of an electrode 113a and a piezoelectric body 113b, and a fourth piezoelectric element consisting of an electrode 114a and a piezoelectric body 114b. Moreover, this angular velocity sensor includes: an amplifier 106 and a phase converter 116 connected to the first piezoelectric element 111 and to the second piezoelectric element 112; a differential amplifier 119 connected to the third piezoelectric element 113 and to the fourth piezoelectric element 114; a synchronization detector 119 connected to the differential amplifier 118; and a low pass filter 120 connected to the synchronization detector 119.

In the angular velocity sensor using such an oscillator 115 of a square pole shape, the first piezoelectric element 111 generates oscillation of the oscillator 115; the second piezoelectric element 112 detects oscillation of the oscillator 115 for generating self-oscillation; and the third piezoelectric element 113 and the fourth piezoelectric element 114 are used to detect a Coriolis force generated in the oscillator 115. That is, in this angular velocity sensor, each of the piezoelectric elements is used for a single function: the piezoelectric element for oscillating the oscillator 115, the piezoelectric element for detecting oscillation of the oscillator 114 for generating self-oscillation, and the piezoelectric elements for detecting a Coriolis force. Consequently, it is possible to utilize a sufficient capability of each of the piezoelectric elements.

However, this angular velocity sensor requires at least two piezoelectric elements for driving the oscillator and furthermore, at least four piezoelectric elements if those for detecting Coriolis force are included. This makes a disadvantage in production costs. Moreover, when such a plenty of piezoelectric elements are used, it becomes difficult to adjust the oscillation frequency of the oscillator 115. Thus, an angular velocity sensor using the oscillator 115 of a square pole shape has various problems and has not yet been implemented in practice.

As has thus far been described, the method using an externally-oscillated type drive circuit has a problem of sensitivity change due to temperature characteristics. This problem can be solved by a self-oscillation type drive circuit using a phase oscillation circuit, but the angular velocity sensor shown in FIG. 1 sacrifices sensitivity because the same piezoelectric elements are shared for driving the oscillator 104 and for detecting a Coriolis force. On the other hand, the angular velocity sensor as shown in FIG. 2 has the disadvantage in production costs and also has a problem that it is difficult to adjust the frequency, which disables to implement in practice.

Moreover, in the conventional angular velocity sensors as shown in FIG. 1 and FIG. 2, the circuits of the amplifiers 105 and 111, the phase converters 106 and 115 and the like are comparatively complicated, and it is desired to develop an angular velocity sensor having a simplified circuit.

SUMMARY OF THE INVENTION

It is therefore an object of the present invention to provide an angular velocity sensor having a simplified configuration, enabling to sufficiently utilize the capability of piezoelectric elements, and having a superior detection sensitivity.

The angular velocity sensor according to the present invention includes: a piezoelectric elements attached to a constant-elastic metal oscillator; a detection block for detecting oscillation of the constant elastic metal oscillator; and a self-oscillation type drive circuit in which the piezoelectric element is made to function as an impedance element of the Colpitts oscillation circuit.

In the aforementioned angular velocity sensor, only one piezoelectric element constitutes the self-oscillation type drive circuit. Moreover, the detection block preferably includes an angular velocity detecting piezoelectric element attached to the constant-elastic metal oscillator, so as to detect the Coriolis force generated in the constant-elastic metal oscillator.

Moreover, the angular velocity sensor according to another aspect of the present invention includes: a piezoelectric body oscillator to which a plurality of electrodes are attached; a detection block for detecting oscillation of the piezoelectric body oscillator; and a self-oscillation type drive circuit in which the piezoelectric body oscillator is made to function as an impedance element of the Colpitts oscillation circuit.

In the aforementioned angular velocity, the impedance element is made from, for example, the piezoelectric body oscillator and a pair of electrodes provided on the piezoelectric oscillator. Moreover, in the aforementioned angular velocity sensor, for example, the piezoelectric body oscillator includes at least a pair of electrodes connected to the self-oscillation type drive circuit and a pair of electrodes connected to the detection block, and the detection block detects a voltage change between the at least one pair of electrodes, so as to detect the Coriolis force generated in the piezoelectric body oscillator.

As the angular velocity sensor according to the present invention is a self-oscillation type angular velocity sensor and has no danger of deterioration of sensitivity affected by temperature characteristics as in an externally-oscillated angular velocity sensor. Moreover, in the angular velocity sensor according to the present invention, a piezoelectric element attached to a constant-elastic metal oscillator or a piezoelectric body oscillator having a plurality of electrodes attached is made to function as an impedance element of the Colpitts oscillation circuit, constituting a self-oscillation type drive circuit. Consequently, it is possible to utilize the element for oscillating the oscillator as an element for detecting oscillation of the oscillator for generating self-oscillation. Moreover, it is possible to easily adjust the frequency. Furthermore, this self-oscillation type drive circuit can be constituted by a significantly simplified circuit.

BRIEF DESCRIPTION OF THE DRAWINGS

FIG. 1 shows an example of a conventional angular velocity sensor.

FIG. 2 shows another example of a conventional angular velocity sensor.

DETAILED DESCRIPTION OF THE PREFERRED EMBODIMENTS

Description will now be directed preferred embodiments of the present invention with reference to the attached drawings. It should be noted that the present invention is not limited to the following embodiments but can be modified in various ways within the scope of the present innovation.

Figure 1A:
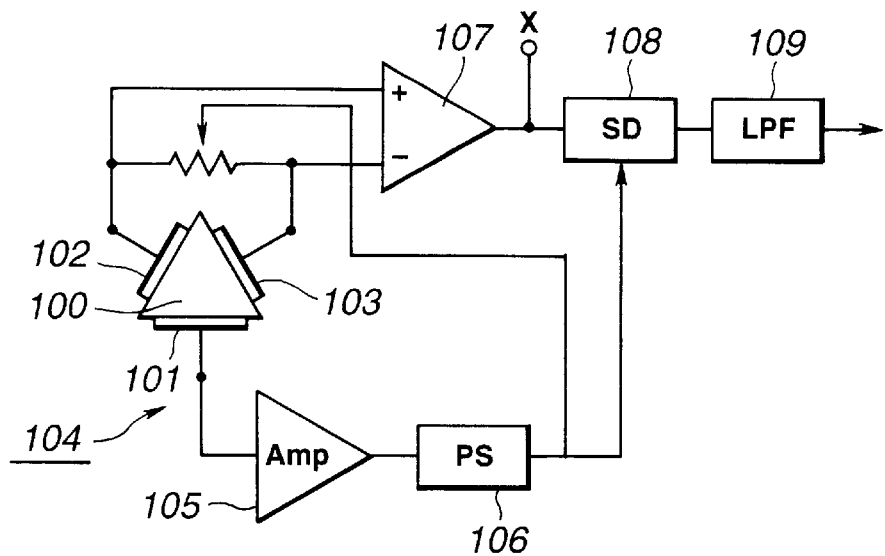
FIG. 1A shows the entire configuration of the conventional angular velocity sensor.
Figure 1B:
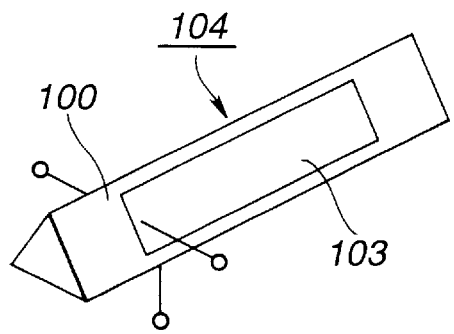
FIG. 1B is a perspective view showing an oscillator.
Figure 1C:
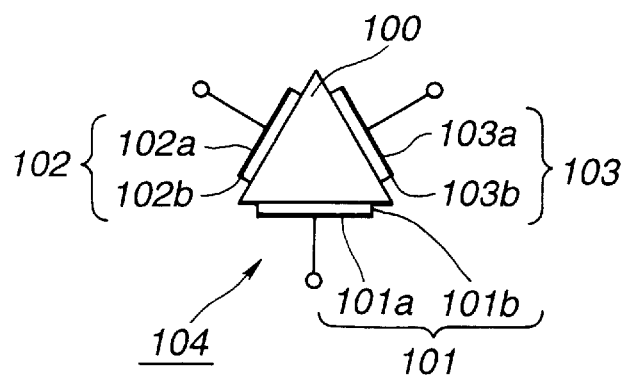
FIG. 1C is cross-sectional view showing the center portion of the oscillator.
Figure 3:
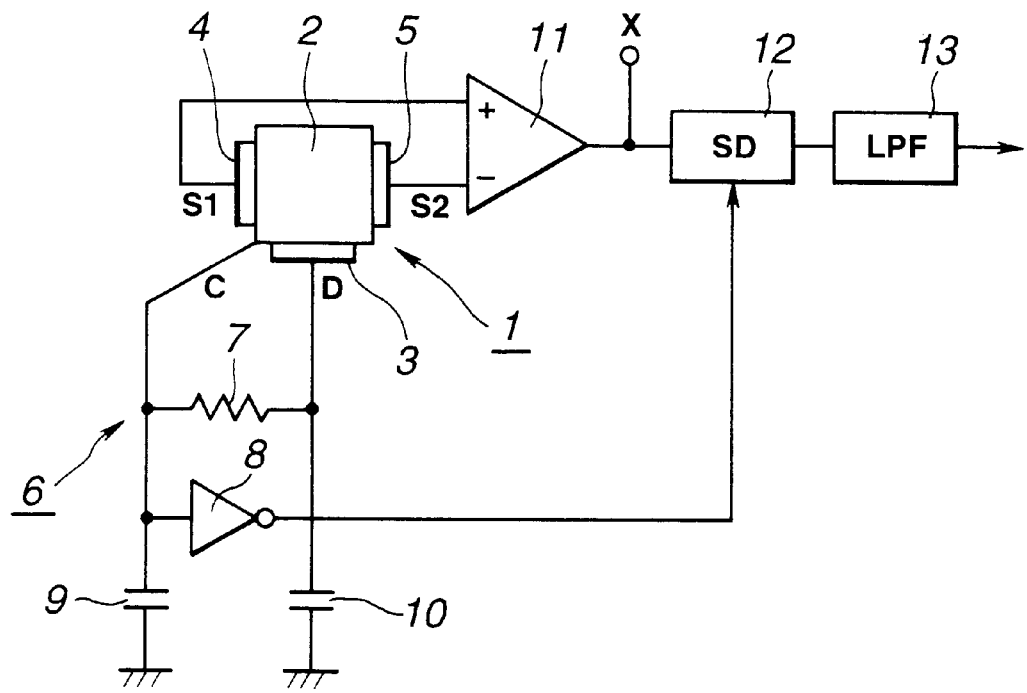
FIG. 3 shows an angular velocity sensor according to an embodiment of the present invention.
Figure 4:
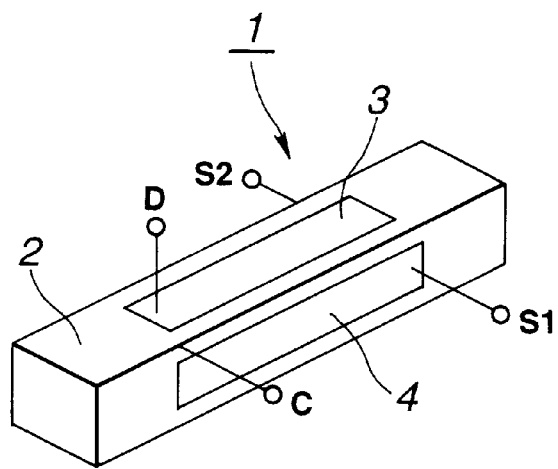
FIG. 4 is a perspective view showing an oscillator used in the angular velocity sensor shown in FIG. 3.

FIG. 3 shows a basic configuration of an angular velocity sensor according to an embodiment of the present invention. As shown in FIG. 1, this angular velocity sensor includes an oscillator 1 in the oscillation gyro portion. The oscillator 1, as shown in FIG. 4 and FIG. 5, includes: a constant-elastic metal oscillator 2 of a square pole shape; a first piezoelectric element 3 of a rectangular shape attached to one of the faces of the constant-elastic metal oscillator 2; a second piezoelectric element 4 of a rectangular shape attached to another face of the constant-elastic metal oscillator 2; and a third piezoelectric element 5 of a rectangular shape attached to another face of the constant-elastic metal oscillator 2.

Figure 5:
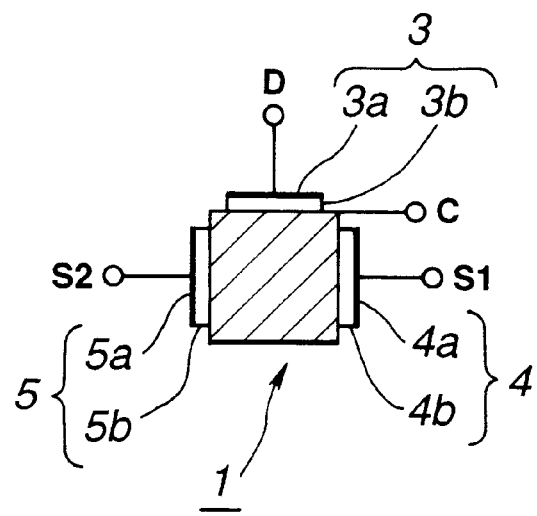
FIG. 5 is a cross-sectional view showing a center portion of the oscillator used in the angular velocity sensor of FIG. 3.

Here, the first piezoelectric element 3 serves to drive the constant-elastic metal oscillator 2 and as shown in FIG. 5, is made from a piezoelectric body 3b to which an electrode 3a is attached. This first piezoelectric element 3 oscillates the oscillator 1 as well as serves as an impedance element of a self-oscillation type drive circuit 6 which will be detailed later.

On the other hand, the second piezoelectric element 4 and the third piezoelectric element 5 serve to detect a Coriolis force generated in the oscillator 1. As shown in FIG. 5, the second piezoelectric element 4 is made from a piezoelectric body 4b to which an electrode 4a is attached, and the third piezoelectric element 5 is made from a piezoelectric body 5b to which an electrode 5a is attached. The second piezoelectric element 4 and the third piezoelectric element 5 are attached to opposing faces of the constant-elastic metal oscillator 2.

The constant-elastic metal oscillator 2 has a terminal C; the first piezoelectric element 3 has a terminal D; the second piezoelectric element 4 has a terminal S1; and the third piezoelectric element 5 has a terminal S2.

Moreover, this angular velocity sensor includes a self-oscillation type drive circuit 6 having a configuration in which the first piezoelectric element 3 functions as an impedance element of Colpitts oscillation circuit. When driving the angular velocity sensor, this self-oscillation type drive circuit 6 causes self-oscillation so as to oscillate the oscillator 1.

Figure 6:
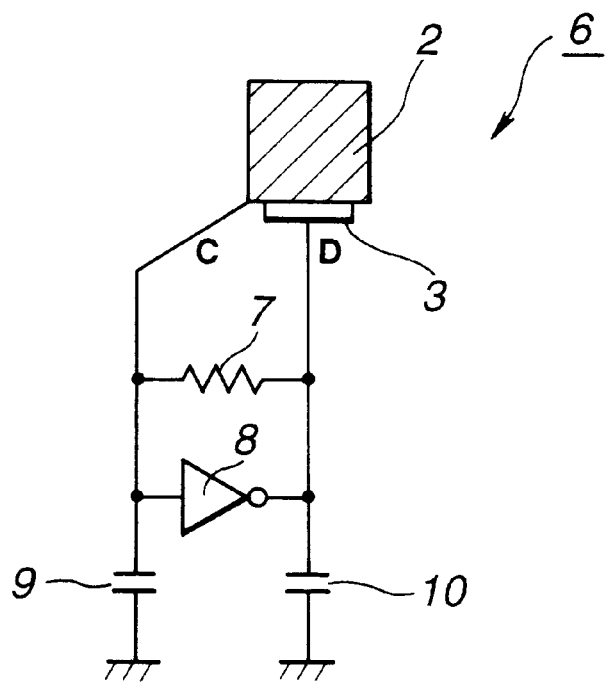
FIG. 6 shows a self-oscillation type drive circuit of the angular velocity sensor shown in FIG. 3.

FIG. 6 shows the portion of this self-oscillation type drive circuit 6. As shown in FIG. 6, this self-oscillation type drive circuit 6 includes: the constant-elastic metal oscillator 2; the first piezoelectric element 3; a resistor 7; an inverter 8; a first capacitor 9; and a second capacitor 10. The terminal C from the constant-elastic metal oscillator 2 is connected to one end of the resistor 7, an input terminal of the inverter 8, and one end of the first capacitor 9. The terminal D from the first piezoelectric element 3 is connected to the other end of the resistor 7, an output terminal of the inverter 8, and one end of the second capacitor 10. The other end of the capacitor 9 and the other end of the second capacitor are grounded.

Figure 7:
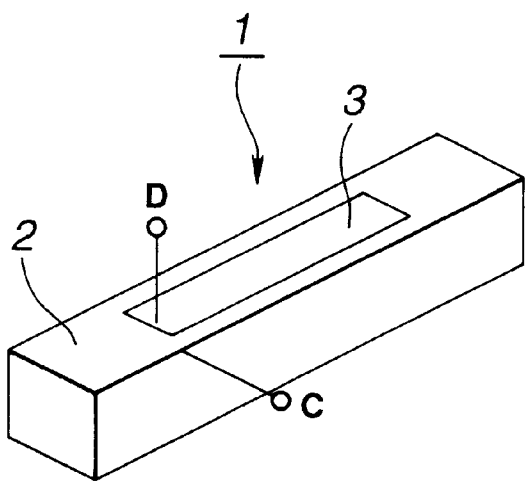
FIG. 7 is a perspective view showing the portion constituting the self-oscillation type drive circuit of the oscillator used in the angular velocity sensor shown in FIG. 3.
Figure 8:
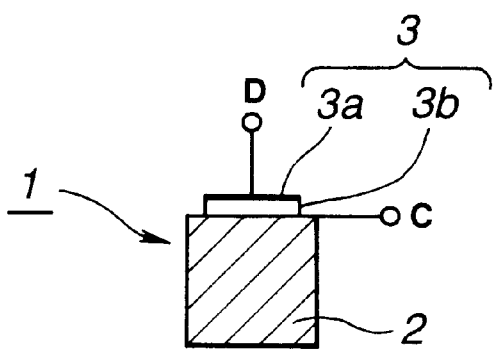
FIG. 8 is a cross-sectional view showing a center portion constituting the self-oscillation circuit of the oscillator used in the angular velocity sensor shown in FIG. 3.

In this self-oscillation type drive circuit, a resistance R of the resistor 7, a capacity $C_1$ of the first capacitor 9, and a capacity $C_2$ of the second capacitor 10, as shown in FIG. 7 and FIG. 8, are constants which are determined by the configuration of the material of the oscillator 1 made from the constant-elastic metal oscillator 2 to which the first piezoelectric element 3 is attached. Note that the second piezoelectric element 4 and the third piezoelectric element 5 are omitted from FIG. 7 and FIG. 8.

When the oscillator 1 as shown in FIG. 7 and FIG. 8 has a natural load capacity $C_L$, the relationship between this natural load capacity CL and the capacity $C_1$ of the first capacitor 9 and the capacity $C_2$ of the second capacitor 10 can be expressed by Equation (1) as follows.

$$1/C_L = 1/C_1 + 1/C_2 \tag{1}$$

Figure 9:
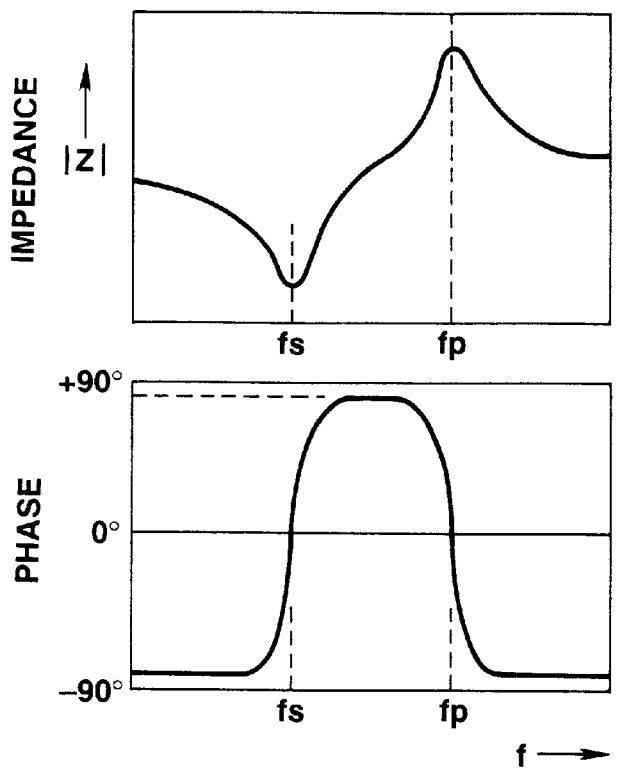
FIG. 9 shows impedance characteristics of the oscillator used in the angular velocity sensor shown in FIG. 3.
Figure 10:
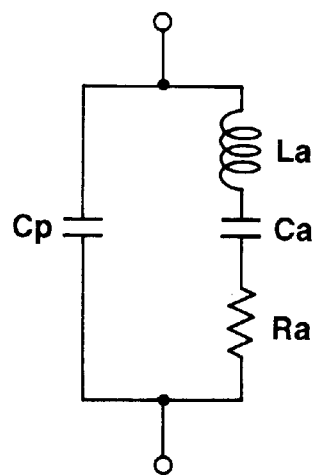
FIG. 10 shows an equivalent circuit of the oscillator used in the angular velocity sensor shown in FIG. 3

On the other hand, the oscillator 1 shown in FIG. 7 and FIG. 8 exhibits an impedance characteristic as shown in FIG. 9 in the vicinity of the series resonance frequency fs and the parallel resonance frequency fp. This equivalent circuit, as shown in FIG. 10, can be expressed by an equivalent parallel capacity Cp, an equivalent series inductor Ls, an equivalent series capacity Cs, and an equivalent series resistance Rs, in the same way as in an equivalent circuit using a crystal oscillator. Consequently, it is possible to employ the Colpitts oscillation circuit which is widely used in the crystal oscillation circuit, for the oscillator 1 shown in FIG. 7 and FIG. 8. That is, it is possible to prepare a self-oscillation circuit by preparing a circuit as shown in FIG. 6 in which the first piezoelectric element 3 is made to function as an impedance element of the Colpitts oscillation circuit. It should be noted that the self-oscillation type drive circuit 6 shown in FIG. 6 is an example of the Colpitts oscillation circuit, and the present invention is not limited to such a circuit configuration.

Moreover, as shown in FIG. 3, the aforementioned angular velocity sensor includes a differential amplifier 11, a synchronization detector 12, and a low pass filter 13, which together with the second piezoelectric element 4 and the second piezoelectric element 5 constitute a detection block for detecting oscillation of the constant-elastic metal oscillator 2. That is, this detection block detects a Coriolis force generated by the oscillator 1 when the oscillator 1 is rotated while the oscillator 1 is oscillated by the aforementioned self-oscillation type drive circuit 6. This angular velocity sensor detects an angular velocity according to the Coriolis force thus detected.

In the aforementioned detection block, the terminal S1 from the second piezoelectric element 4 is connected to a plus input terminal of the differential amplifier 11, whereas the terminal S2 from the third piezoelectric element 5 is connected to a minus input terminal of the differential amplifier 11. That is, outputs from the second piezoelectric element 4 and the third piezoelectric element 5 are supplied to the differential amplifier 11, so as to obtain a difference between these output. An output from the differential amplifier 11 is supplied to the synchronization detector 12 for synchronization detection. Here, the synchronization detector 12 is also supplied with an output from the inverter 8 of the self-oscillation type drive circuit 6 for synchronization detection. Then, an output from the synchronization detector 12 is outputted via the low pass filter as the result of detection of the Coriolis force generated in the oscillator 1.

Figure 11:
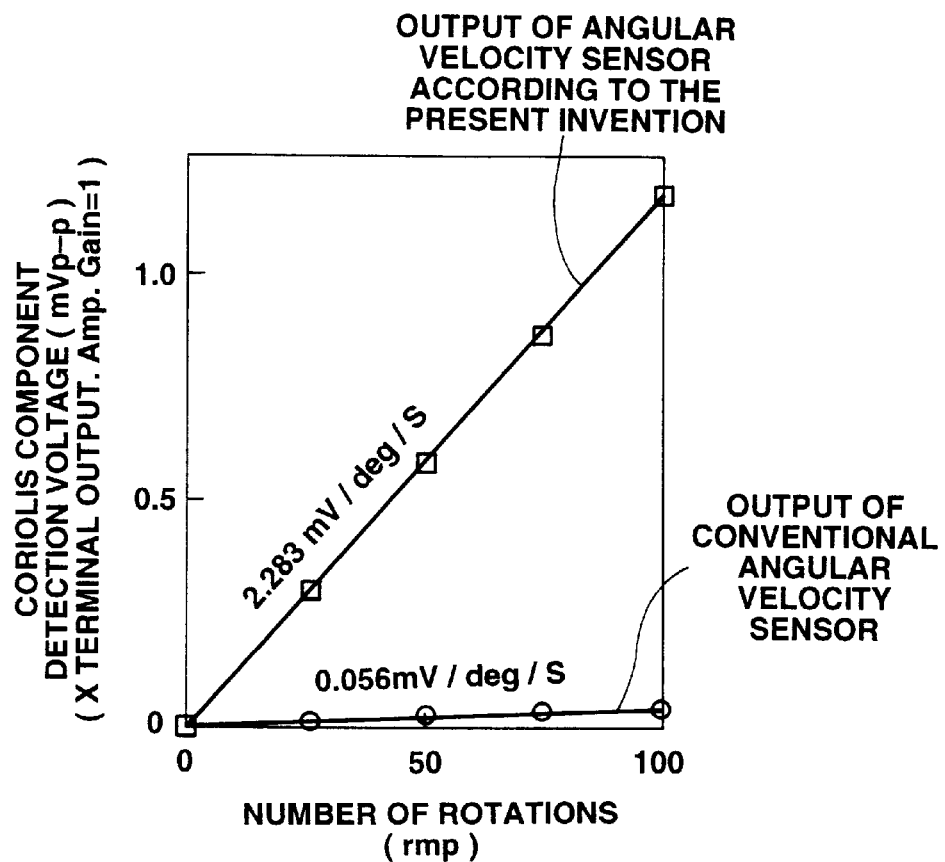
FIG. 11 compares an output of the angular velocity sensor according to the present invention with an output of a conventional angular velocity sensor.

The angular velocity sensor according to the present invention was compared to the angular velocity sensor as shown in FIG. 1 which is conventionally said to have the highest sensitivity by actually measuring the detection sensitivity of Coriolis component when the angular velocity sensors are rotated. The comparison results are shown in FIG. 11. From this FIG. 9, it can be understood that the angular velocity sensor according to the present invention enables to obtain a sensitivity 40 times higher than the conventional angular velocity sensor.

Figure 2A:
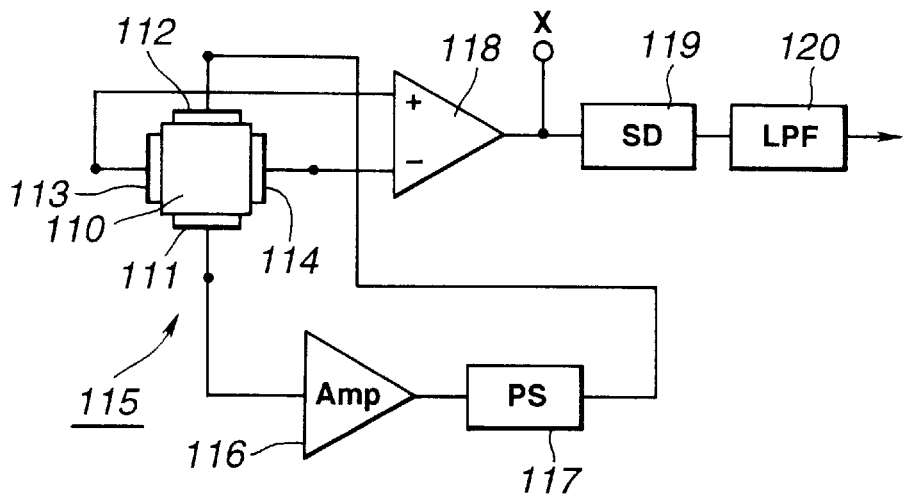
FIG. 2A shows the entire configuration of the conventional angular velocity sensor.
Figure 2B:
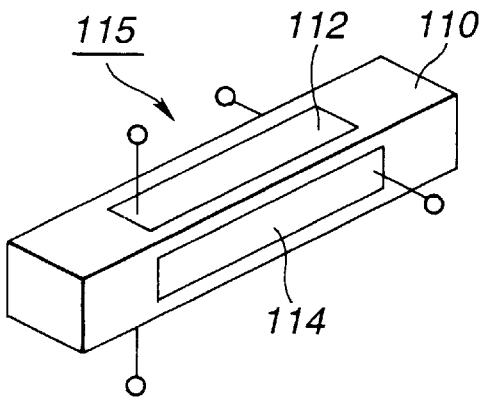
FIG. 2B is a perspective view showing an oscillator.
Figure 2C:
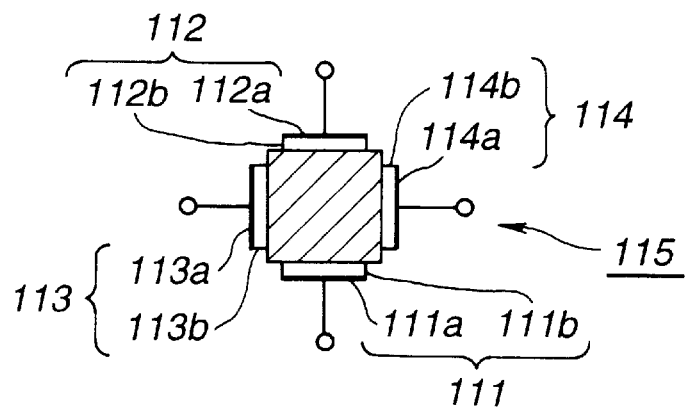
FIG. 2C is cross-sectional view showing the center portion of the oscillator.

It should also be noted that the angular velocity sensor using an oscillator of square pole shape as shown in FIG. 2, requires at least to piezoelectric elements 111 and 112 as piezoelectric elements constituting the self-oscillation type drive circuit. In contrast to this, the aforementioned angular velocity sensor according to the present invention, although using the oscillator 1 of a square pole shape, requires on the first piezoelectric element 3 which serving as a piezoelectric element constituting the self-oscillation type drive circuit 6. That is, in the angular velocity sensor according to the present invention, the number of piezoelectric elements required for constituting the self-oscillation type drive circuit 6 is reduced compared to the conventional angular velocity sensor. Moreover, only the third piezoelectric element 3 is used as the piezoelectric element constituting the self-oscillation type drive circuit 6, which enables to easily adjust the oscillation frequency of the oscillator 1.

Moreover, the aforementioned angular velocity sensor using the self-oscillation type drive circuit 6 can oscillate basically by the resonance frequency of the oscillator 1. Consequently, there is no danger of deterioration in sensitivity due to temperature characteristics as in the externally-oscillated type angular velocity sensor.

Furthermore, in the aforementioned angular velocity sensor, configuration of the self-oscillation type drive circuit 6 is significantly simplified in comparison to the conventional angular velocity sensor as shown in FIG. 1 and FIG. 2. Consequently, the aforementioned angular velocity sensor can significantly reduce the number of components required for constituting the circuit. The reduction in the number of components in turn increases the production yield.

It should be noted that the present invention is not limited to the aforementioned angular velocity sensor having the oscillator 1 of a square pole shape but can widely be applied to angular velocity sensors using an oscillator which exhibits the impedance characteristic as shown in FIG. 9. FIG. 12 to FIG. 21 show some of such examples of oscillator. Note that in FIG. 12 to FIG. 21, elements required for detecting Coriolis force generated in the oscillator are omitted.

Figure 12:
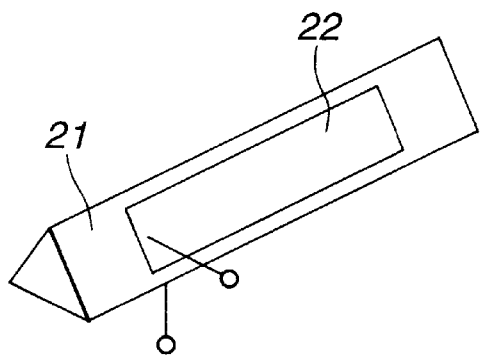
FIG. 12 is a perspective view of an oscillator used in the angular velocity sensor according to another embodiment of the present invention.
Figure 13:
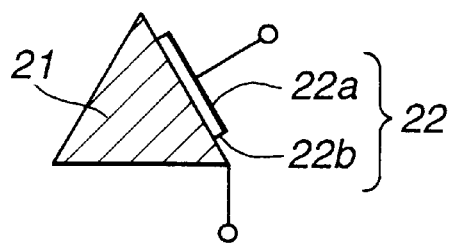
FIG. 13 is a cross-sectional view showing a center portion of the oscillator of FIG. 12.

FIG. 12 and FIG. 13 show an oscillator made from a constant-elastic metal oscillator 21 of a triangle pole shape having a piezoelectric element 22 consisting of an electrode 22a and a piezoelectric body 22b. According to the present invention, it is possible use an oscillator made from a constant-elastic metal oscillator of polygonal pole or cylindrical shape to which a piezoelectric element is attached.

In the conventional angular velocity sensor using the oscillator of a triangle pole shape as shown in FIG. 1, common piezoelectric elements are used both as the piezoelectric elements for detecting oscillation of the oscillator so as to generate self-oscillation and as the piezoelectric elements for detecting the Coriolis force and accordingly, the voltage used for detecting the Coriolis force is limited by the drive voltage and the power voltage. On the contrary, in the angular velocity sensor according to the present invention, the piezoelectric element for self-oscillation and the piezoelectric element for detecting the Coriolis force are separate piezoelectric elements and it is possible to sufficiently utilize the capability of the respective piezoelectric elements. Consequently, when the present invention is applied to the angular velocity sensor using the oscillator of a triangle pole shape as shown in FIG. 12 and FIG. 13, the detection sensitivity is significantly enhanced.

Figure 14:
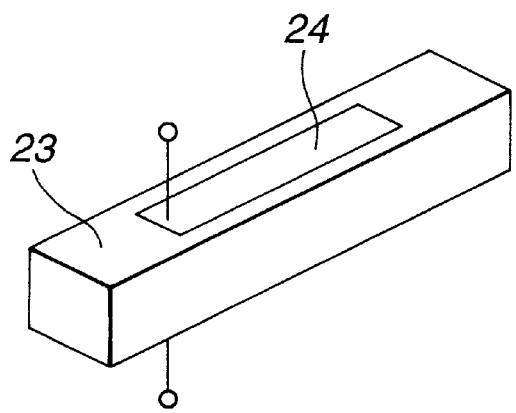
FIG. 14 is a perspective view showing an oscillator used in the angular velocity sensor according to yet another embodiment of the present invention.
Figure 15:
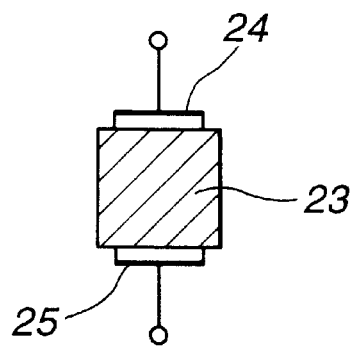
FIG. 15 is a cross-sectional view showing a center portion of the oscillator shown in FIG. 12.
Figure 16:
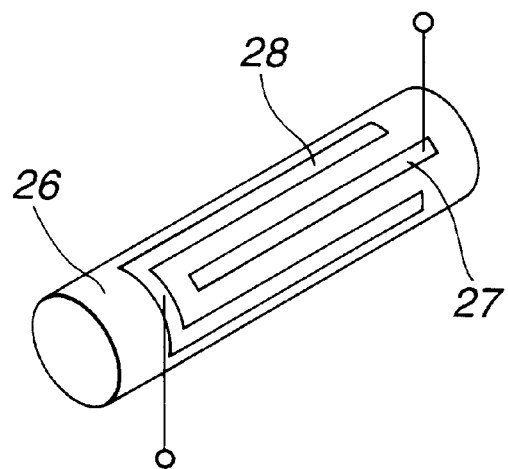
FIG. 16 is a perspective view showing an oscillator used in the angular velocity sensor according to still another embodiment of the present invention.
Figure 17:
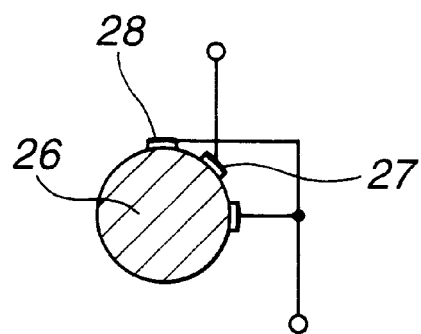
FIG. 17 is a cross-sectional view showing a center portion of the oscillator shown in FIG. 16.

FIG. 14 and FIG. 15 show an oscillator is made from a piezoelectric oscillator 23 of a square pole shape to which a pair of electrodes 24 and 25 is attached, The present invention covers piezoelectric oscillators of all the types of polygonal pole shapes including the square pole shape to which a pair of electrodes is attached. Moreover, as shown in FIG. 16 and FIG. 17, it is possible to use an oscillator made from a cylindrical piezoelectric oscillator 26 to which a pair of electrodes 27 and 28 is attached.

Figure 18:
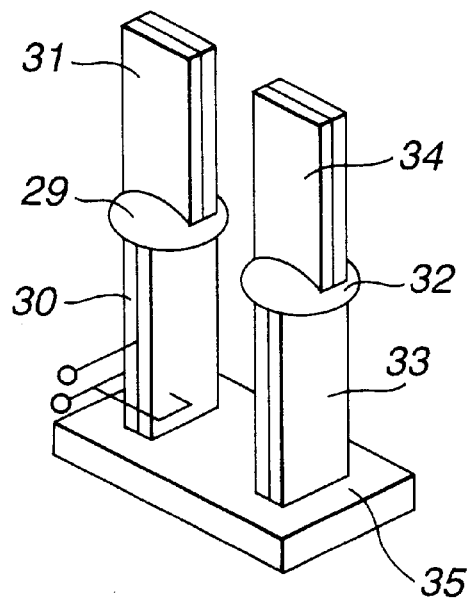
FIG. 18 is a perspective view showing an oscillator used in the angular velocity sensor according to still yet another embodiment of the present invention.
Figure 19:
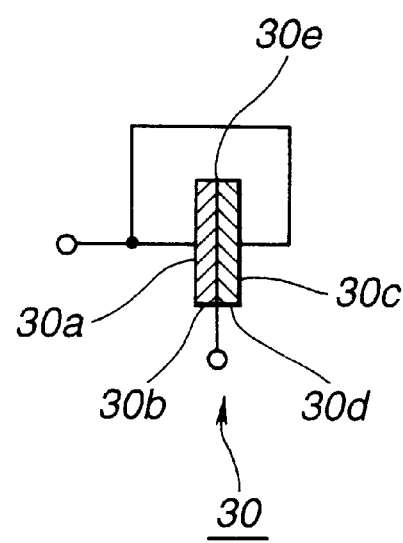
FIG. 19 is a cross-sectional view showing a piezoelectric bimorph used in the oscillator shown in FIG. 18.
Figure 20:
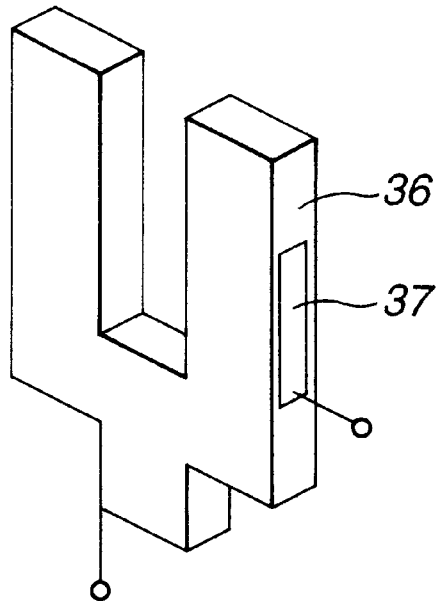
FIG. 20 is a perspective view showing an oscillator used in the angular velocity sensor according to still another embodiment of the present invention.
Figure 21:
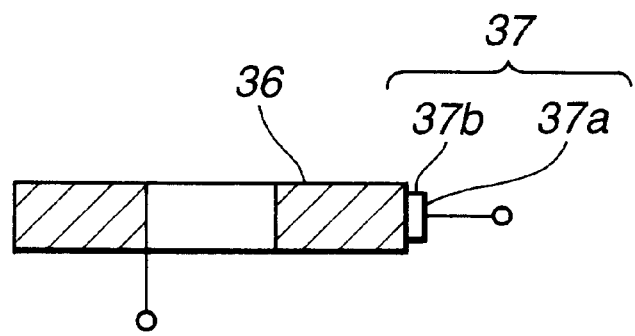
FIG. 21 is a cross-sectional view showing the oscillator shown in FIG. 20

Moreover, according to the present invention, it is possible to use an oscillator of a tuning fork shape as shown in FIG. 18 to FIG. 21. The oscillator shown in FIG. 18 and FIG. 19 is a composite tuning fork type oscillator including a pair of piezoelectric bimorphs 30 and 31 connected to each other by a connector 29 and a pair of piezoelectric bimorphs 33 and 34 connected to each other by a connector 32, both pairs fixed to a seat 35. Here, the piezoelectric bimorph 30, as shown in FIG. 19, consists of a piezoelectric body 30b to which an electrode 30a is attached and a piezoelectric body 30d to which an electrode 30c is attached which are connected to each other via an electrode 30e. The other piezoelectric bimorphs 31, 33, and 34 have the identical configuration. Moreover, FIG. 20 and FIG. 21 show an oscillator which is a turning force type oscillator made from a constant-elastic metal oscillator 36 having a tuning fork shape having a piezoelectric element 37 consisting of an electrode 37a and a piezoelectric body 37b.

As has thus far been described, according to the present invention, a part of an oscillator is made to serve as an impedance element of the Colpitts oscillation circuit, thus constituting a self-oscillation type drive circuit. This realizes a simplified configuration of an angular velocity sensor having a superior detection sensitivity and temperature characteristics. Consequently, the present invention enables to reduce the production costs of the angular velocity sensor, reduce the size, and further increase the detection sensitivity. This enables to answer to the requirements of a high cost performance and reduction in production costs of a video camera, a virtual reality apparatus, a car navigation system, and the like.

What is claimed is:

1. An angular velocity sensor, comprising:
    first, second and third piezoelectric elements attached to a constant-elastic metal oscillator;
    a detection block for detecting a Coriolis force generated in said constant-elastic metal oscillator, said detection block including both said first and second piezoelectric elements; and
    a self-oscillation type drive circuit, said drive circuit including only said third piezoelectric element, wherein said third piezoelectric element serves as an impedance element of a Colpitts oscillation circuit for oscillating the constant-elastic metal oscillator and for detecting oscillation of said constant-elastic metal oscillator, said third piezoelectric element not included in said detection block and not used for detecting the Coriolis force.

2. An angular velocity sensor as claimed in claim 1 wherein said constant-elastic metal oscillator includes an electrode such that said drive circuit connects both to said constant-elastic metal oscillator via said electrode and to said third piezoelectric element.

3. An angular velocity sensor as claimed in claim 1, wherein said detection block detects a voltage change between said first and second piezoelectric elements so as to detect the Coriolis force generated in said constant-elastic metal oscillator.

* * * * *